Dec. 25, 1962
M. A. CROSBY
3,069,902
TORQUE SENSITIVE DEVICE
Filed May 19, 1961
3 Sheets-Sheet 1
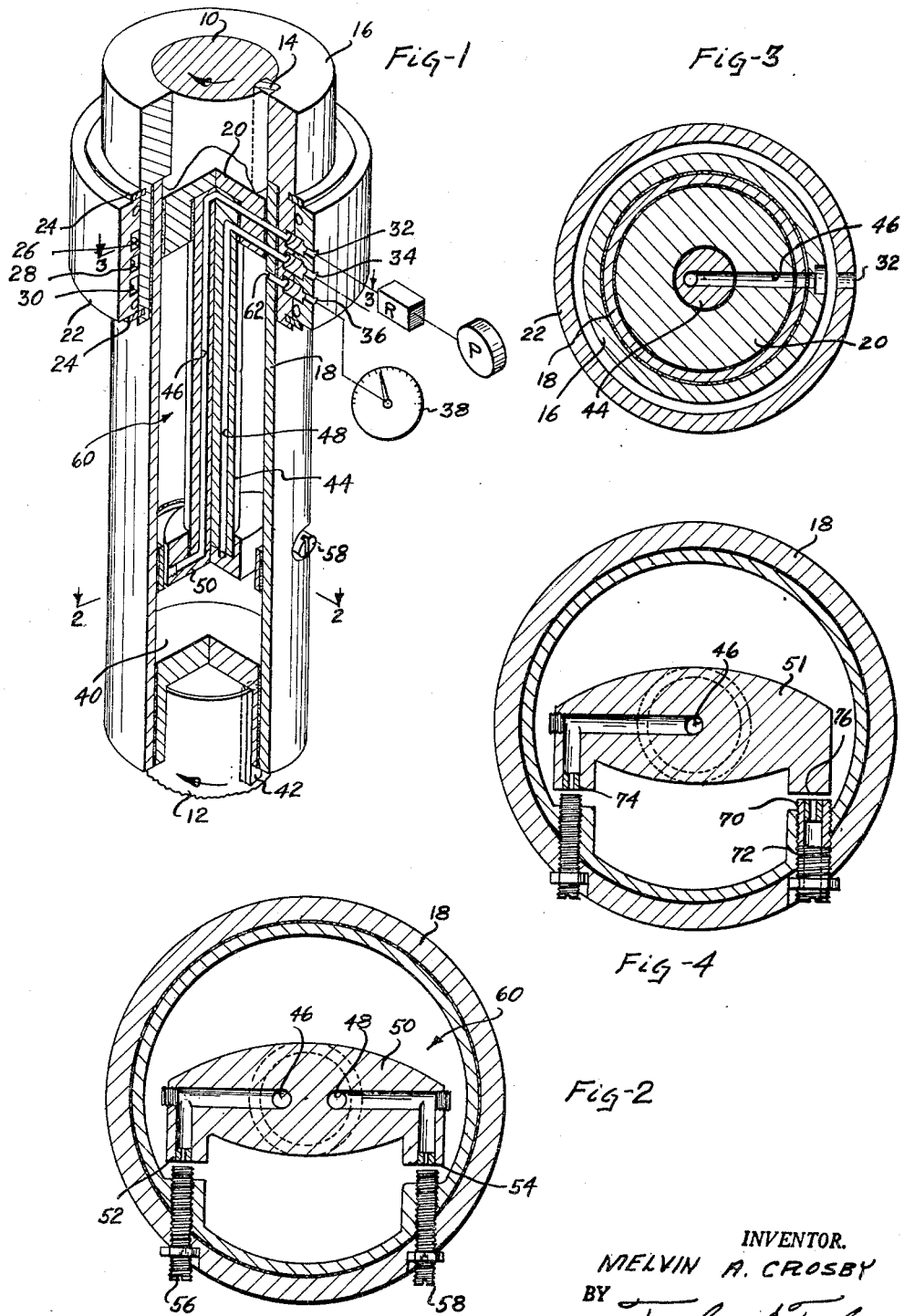
INVENTOR.
MELVIN A. CROSBY
BY
ATTORNEYS

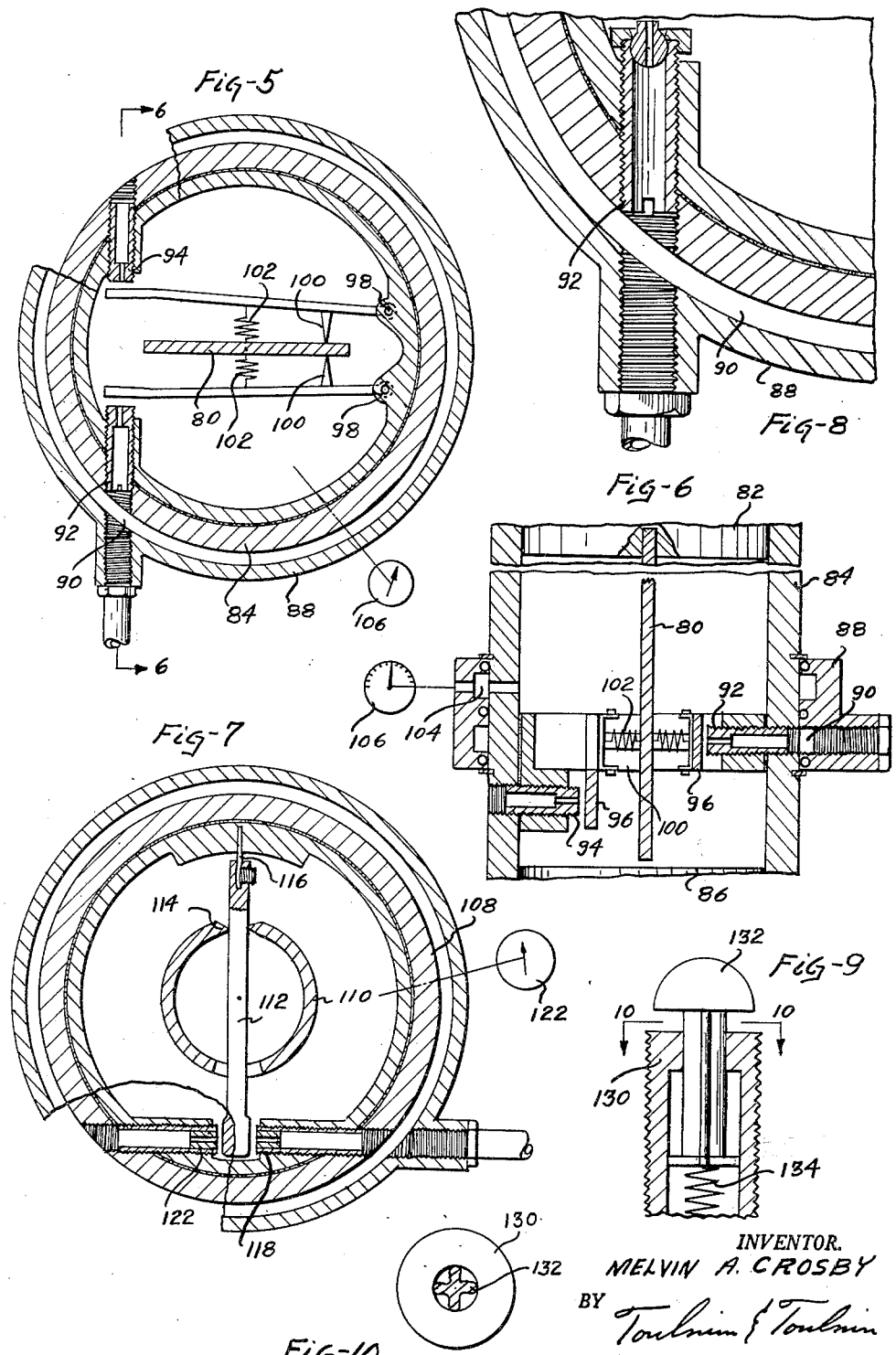

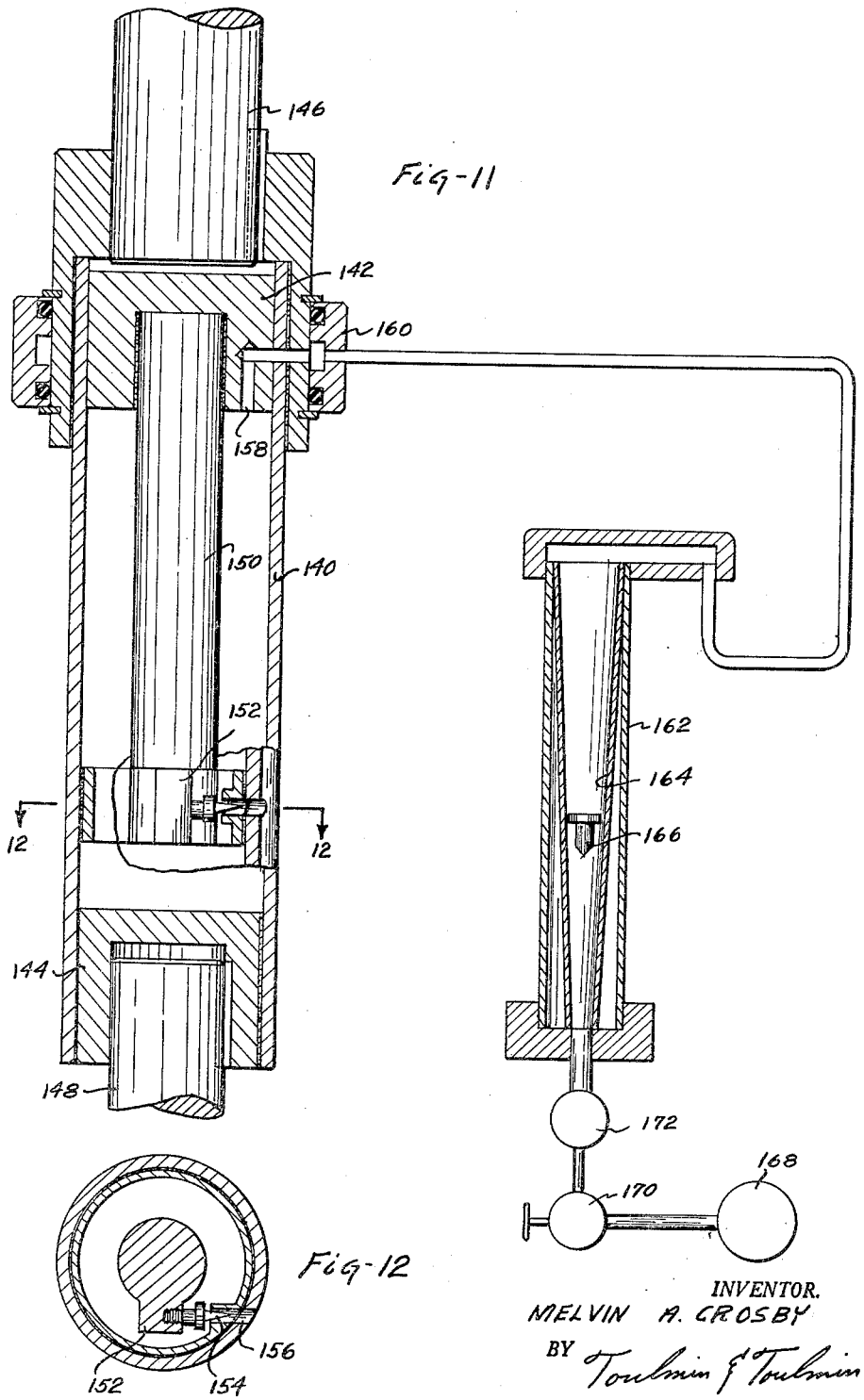

United States Patent Office 3,069,902
Patented Dec. 25, 1962

3,069,902
TORQUE SENSITIVE DEVICE
Melvin A. Crosby, Dayton, Ohio, assignor to Basic Research, Inc., Dayton, Ohio, a corporation of Delaware
Filed May 19, 1961, Ser. No. 111,355
7 Claims. (Cl. 73—136)

This invention relates to a method and apparatus for measuring, and is particularly concerned with an air operated torque measuring device.

Many times it is desired to measure and indicate torque either for the purpose of defining the amount of torque of a member or for the purpose of controlling the power supply to the member in order to limit the said torque. The present invention is particularly concerned with a method and apparatus for accomplishing this result.

A particular object of this invention is the provision of a method and apparatus for detecting and indicating torque in which a gas under pressure, such as air, is employed as the measuring and indicating medium.

Still another object of this invention is the provision of a torque measuring and indicating device which can readily be incorporated between a driving and driven member and which will not detract from or interfere with the transmission of power therebetween.

Still another object of this invention is the provision of a torque sensitive unit that can be connected between a driving and driven member and which can readily be made especially strong to withstand the maximum torque that might be imposed thereon.

The foregoing objects as well as still other objects and advantages of the present invention will become more apparent upon reference to the following specification taken in connection with the accompanying drawings, in which:

FIGURE 1 is a perspective view partly in section showing one form of a torque sensitive unit according to my invention;

FIGURE 2 is a transverse sectional view indicated by line 2—2 on FIGURE 1;

FIGURE 3 is a sectional view indicated by line 3—3 on FIGURE 1;

FIGURE 4 is a view similar to FIGURE 2 but showing a somewhat modified arrangement;

FIGURE 5 is a sectional view through a modified arrangement in which pivoted blades are employed for varying the jets of the device;

FIGURE 6 is a sectional view indicated by line 6—6 on FIGURE 5;

FIGURE 7 is a sectional view showing still another modified arrangement;

FIGURE 8 is a fragmentary sectional view showing an arrangement for changing the angularity of a nozzle in the device to insure proper seating of the control element therefor;

FIGURE 9 is a fragmentary view showing a nozzle arrangement having a movable restrictor carried thereby;

FIGURE 10 is a sectional view indicated by line 10—10 on FIGURE 9;

FIGURE 11 is a more or less diagrammatic view showing the manner of arranging a device according to the present invention so that it is sensitive to rate of flow instead of to varying pressures; and FIGURE 12 is a transverse sectional view indicated by line 12—12 on FIGURE 11.

In FIGURE 1, 10 and 12 indicate driving and driven shafts. Keyed to shaft 10 by key 14 is a connector member 16 forming a part of the torque sensitive device of the present invention. Connecter member 16 has a recess into which extends one end of a tube 18 which is fixably connected to the connecter as by brazing or the like. The end of tube 18 adjacent the end of shaft 10 is sealed by a plug 20 fixed therein, also as by brazing.

Rotatably mounted on the outside of connecter member 16 is a valve ring 22 which is held in place on connecter 16 by snap rings 24. Inside valve ring 22 are grooves 26, 28 and 30. Groove 26 communicates with a source of air pressure P via regulator R through port 32.

Groove 28 communicates through port 34 with the atmosphere whereas groove 30 communicates through port 36 with a pressure sensitive indicating instrument 38.

The lower end of tube 18 has sealingly fixed therein a recessed plug 40 which is connected by key 42 with shaft 12 thereby drivingly interconnecting shafts 10 and 12. At this point it will be evident that tube 18 will twist about its axis in proportion to the amount of torque being transmitted between the driving and driven shafts.

The twisting of tube 18 is availed of for measuring the torque being exerted by fixing in plug 20 a rod 44 which is free at its lower end. Since rod 44 is not subjected to any torque, the lower end thereof will turn relative to the end of tube 18 when the tube 18 has torsional stress imposed thereon.

The rod 44 has a first longitudinal passage 46 formed therein that communicates with groove 26, and a second longitudinal passage 48 formed therein that communicates with groove 28.

As will be seen in FIGURE 2 the lower end of rod 44 terminates in a T-shaped head portion 50 and the passages 46 and 48 lead outwardly through the head portion 50 and terminate in the nozzle elements 52 and 54, respectively. There is threaded through the wall of tube 18 in the plane in the nozzle elements, the adjusting screws 56 and 58 respectively, the inner ends of which are closely spaced from the nozzle elements. It will be evident that any twisting of the tube 18 will result in the throttling of one of the nozzle elements to a greater degree while simultaneously the throttling on the other nozzle element is reduced.

Inasmuch as passage 46 is constantly supplied with air at a predetermined fixed pressure, while passage 48 is continually freely exhausted to the atmosphere, the space inside tube 18, said space being indicated at 60, will be subjected to a pressure varying from said predetermined fixed pressure to atmospheric. The exact pressure in tube 18 will be determined by the amount and direction of the torque imposed thereon and is thus a reliable indication of said torque.

The space 60 in the tube communicates by way of port 62 with groove 30 of valve ring 24 which is, in turn, connected to the pressure indicating instrument 38. It follows that instrument 38 can be graduated to indicate directly the amount and direction of the torque imposed on tube 18 and which torque is, of course, the torque that is being exerted between the driving and driven shafts.

In the modification just described, the nozzle that is connected to the atmosphere is connected with the atmosphere by way of a passage extending through the valve ring. However this nozzle could be connected directly with the atmosphere through the wall of tube 18 if so desired as indicated by FIGURE 4. This is accomplished by placing the nozzle 70 in a hollow screw 72 that is threaded through the wall of tube 18. The end of the T-head 51 that controls the throttling of the pressure nozzle 74 and the throttling of the exhaust nozzle 70, merely has a flat surface 76 formed thereon adjacent exhaust nozzle 70.

FIGURES 5 and 6 show an arrangement wherein there is a blade 80 fixed in the closure plug 82 at one end of the torsion tube 84. Toward the other end of the tube 84, which is sealed by a second closure member 86 there is a valve ring 88. This valve ring has a pressure groove 90 communicating with the adjacent pressure nozzle 92 that extends out of the torsion tube 84 at one level. At a second level there is the exhaust nozzle 94 that leads to the atmosphere.

Each nozzle has associated therewith a throttle arm or flapper member 96. These flapper members are pivoted at 98 at their ends opposite the nozzle and have knife-edged elements 100 engaging blade 80 adjacent one edge thereof. Springs 102 bias the flapper members away from their pertaining nozzles.

It will be evident that a torsion exerted upon tube 84 will bring about twisting thereof so that the end of blade 80 where it is engaged by knife-edges 100 will move relative to the tube in one circumferential direction or the other and in this manner the nozzles will be differentially influenced. As before, this will vary the pressure inside tube 84 and this pressure is conveyed to a groove 104 in the valve ring and thence to indicating gauge 106. As with the first described modification the possible pressure flowing inside tube 84 is from atmospheric pressure to the pressure supplied to the pressure nozzle.

In FIGURE 7 there is shown an arrangement similar to that of FIGURES 5 and 6 except that in FIGURE 7 the member that turns relative to the torsion tube 108 is a tube 110. This tube 110 is fixed to the closure member in one end of the torsion tube and adjacent the other end of the torsion tube it engages a flapper member 112 by knife-edged means 114 so that as tube 110 turns relative to torsion tube 108, flapper member 112 will be caused to swing about its resilient support 116. The end of the flapper tube opposite its resilient support is disposed between a pressure nozzle 118 and an exhaust nozzle 120, the said nozzles being adjustably carried in the tube by hollow screws, whereby the nozzles will be differentially varied to bring about variation in pressure within the torsion tube.

This pressure is conveyed to an indicating gauge 122 which can be graduated directly in torque.

Instead of having nozzles adapted for being varied directly by a flapper member, the nozzles could be formed as in FIGURES 9 and 10 so that each nozzle member 130 carried its own restrictor element 132 adapted for engaging by a flapper member or the like. A spring biases restrictor element 132 outwardly and when the restrictor element is moved inwardly the movement of gas or air through the restrictor element is varied.

The corresponding arrangements have all indicated the torque being measured by a pressure sensitive instrument. In the modification of FIGURES 11 and 12 there is illustrated an arrangement which is sensitive to the rate of fluid flow of air through the torque sensitive device. In these figures the torsion tube is indicated at 140 and the opposite ends thereof are closed by plugs 142 and 144; shaft means 146 and 148 are connected to opposite ends of the torsion tube so that the tube will twist when subjected to torsion.

Within the tube is a rod-like element 150 fixed to closure member 142 and having an offset T-head 152. At the other end this T-head, as will be seen in FIGURE 12, carries a restrictor element 154 arranged to variably restrict a discharge nozzle 156 as torsion tube 140 twists.

The inside of torsion tube 140 is supplied with air under pressure by way of passage 158 and valve ring 160. The conduit from valve ring 160 leads to the discharge side of a flow sensitive meter 162 which may comprise, for example, a taper tube 164 and a float element 166 therein which assumes a vertical position within the tube according to the rate at which air is flowing thereto.

The lower end of tube 164 is supplied with air under pressure from source 168 via regulator 170 and filter 172. The described arrangement is flow sensitive rather than being pressure sensitive and employs only a single variable nozzle instead of two nozzles in series.

All of the described arrangements are relatively inexpensive and are reliable and accurate and can be introduced into a power system without any difficulty.

It will be understood that this invention is susceptible to modification in order to adapt it to different usages and conditions; and, accordingly, it is desired to comprehend such modifications within this invention as may fall within the scope of the appended claims.

I claim:
1. A device for measuring torque comprising; a tubular member, a closure member sealed in each end of said tubular member, a valve ring rotatably carried by said tubular member having at least two internal grooves, one of said grooves having means for connection to a source of air under pressure and the other thereof having means for connection to a pressure gauge, an element fixed to the closure member in one end of said tubular member and extending to the other end of said tubular member so that twisting of the tubular member will cause the free end of said element to turn relative to the said other end of said tubular member, a first nozzle in the free end of said element offset radially from the axis of said tubular member, a passage connecting said nozzle with said one groove for supplying air to the inside of said tubular member at a controlled rate, a second nozzle in the said other end of said tubular member connected between the inside of said tubular member and the atmosphere for exhausting air from the said tubular member at a controlled rate, means for differentially restricting said nozzles in response to relative circumferential movement of said other end of said tubular member and said element, and means connecting said other groove with the inside of said tubular member.

2. A device for measuring torque comprising; a tubular member closed at each end and twistable under a torsion, an element fixed in the tubular member at one end and extending along the axis of said tubular member toward the other end thereof but terminating short of the said other end of said tubular member, said element having a T-shaped head at its free end, a pair of nozzle means carried by the said head, a valve ring rotatably mounted on said tubular member having a pressure connection to one nozzle means for supplying air at a controlled rate to the inside of said tubular member and also having an exhaust connection to the other nozzle means for the exhausting of air from said tubular member at a controlled rate, a pair of adjustable restrictor means carried by the tube adjacent to said nozzle means spaced slightly therefrom in respectively opposite circumferential directions, and a connection in the valve ring leading to the inside of the said tubular member for connection of a gauge thereto for measuring the pressure in the tubular member.

3. A device for measuring torque comprising; a tubular member closed at both ends and twistable under torsion, an element fixed in the tubular member at one end and extending along the axis of the tubular member toward the other end but terminating short of the said other end of the tubular member, said element having a T-shaped head at its free end, a first nozzle carried by the said head at one end, a second nozzle in the tube at the other end of the head, an adjustable restrictor in the tube adjacent to said first nozzle, said restrictor and said other end of said head being spaced from said first and second nozzles in respectively opposite circumferential directions, and a valve ring rotatably mounted on said tubular member having a connection to said first nozzle for supplying air at a controlled rate therethrough to the inside of said tubular member, said valve ring also having a connection to the inside of said tubular member for connection of a pressure gauge thereto, said second nozzle being connected between the inside of said tubular member and the atmosphere.

4. A device for measuring torque comprising; a tubular member closed at both ends and twistable under torsion, an element fixed in the tubular member at one end and extending along the axis of the tubular member toward the other end but terminating short of the said other end of the tubular member, said element having a T-shaped head at its free end, first and second nozzles in the tube adjacent the said head spaced from opposite ends of the head in respectively opposite circumferential directions, a valve ring rotatably mounted on said tubular member having a connection to said first nozzle for supplying air at a controlled rate therethrough to the inside of said tubular member, said valve ring also having a connection to the inside of said tubular member for the connection of a pressure gauge thereto, and said second nozzle being connected between the inside of said tubular member and the atmosphere.

5. A device for measuring torque comprising; a tubular member closed at both ends and twistable under torsion, an element fixed in the tubular member at one end extending along the axis of the tubular member toward the other end thereof but terminating short of the said other end of said tubular member, first and second nozzles in said tubular member adjacent the free end of said element, a movable restrictor for each nozzle pivotally supported in the tube and spring biased toward its respective nozzle, said restrictors being spaced from their respective nozzles in respectively opposite circumferential directions, said element engaging said restrictors for pivotal movement thereof in response to twisting of said tubular member, the said movement of said restrictor elements relative to their respective nozzles being in respectively opposite directions, and a valve ring rotatably supported on said tubular member having a pressure connection to one of said nozzles to supply air at a controlled rate to the inside of said tubular member and said valve ring also having a connection to the inside of said tubular member for a connection of a pressure gauge thereto, said second nozzle being connected between the inside of said tubular member and the atmosphere.

6. A device for measuring torque comprising; a tubular member closed at both ends and twistable under torsion, an element fixed in the said tubular member at one end and extending along the axis of the tubular member toward the other end thereof but terminating short of the other end of said tubular member, a source of air under pressure connected to the inside of said tubular member and a nozzle leading from the inside of said tubular member to the atmosphere adjacent the free end of said element, a restrictor for said nozzle operable for variably restricting the nozzle as the said tubular member twists relative to said element, and a rate of flow gauge connected between said source of air and said tubular member for indicating the rate of flow of air through said nozzle.

7. A device for measuring torque comprising; a tubular member, a closure member sealed in each end of said tubular member, a valve ring rotatably carried by said tubular member having at least two internal grooves, one of said grooves having means for connection to a source of air under pressure and the other thereof having means for connection to a gauge, an element fixed to the closure member in one end of said tubular member and extending to the other end of said tubular member so that twisting of the tubular member will cause the free end of said element to turn relative to the said other end of said tubular member, first and second nozzles in the region of the free end of said element offset radially from the axis of said tubular member, a passage connecting said first nozzle with said one groove for supplying air to the inside of the tubular member at a controlled rate, said first nozzle opening into the inside of said tubular member in the circumferential direction, said second nozzle opening into said tubular member in the circumferential direction and being connected between the inside of said tubular member and the atmosphere for exhausting air from said tubular member at a controlled rate, means for differentially restricting said nozzles in response to relative circumferential movement of said other end of said tubular member and the free end of said element, and means connecting said other groove of said valve ring with the inside of said tubular member.

References Cited in the file of this patent

UNITED STATES PATENTS

| | | |
|---|---|---|
| 2,635,465 | White | Apr. 21, 1953 |
| 2,827,785 | Robinson | Mar. 25, 1958 |
| 2,867,117 | Ernst | Jan. 6, 1959 |
| 2,998,089 | Ernst | Aug. 29, 1961 |